United States Patent [19]  [11] Patent Number: 4,869,620
Dow  [45] Date of Patent: Sep. 26, 1989

[54] METHOD AND APPARATUS FOR CONSTRUCTING SEAWALLS AND DOCKS

[76] Inventor: John M. Dow, 48 Edward Laurie Drive, Halifax, Nova Scotia, Canada, B3M 2C7

[21] Appl. No.: 252,501
[22] Filed: Sep. 30, 1988
[51] Int. Cl.$^4$ .......................... E02B 3/04; E02D 23/02
[52] U.S. Cl. .................................... 405/206; 249/137; 405/195; 405/204; 405/284
[58] Field of Search .............. 405/222, 223, 195, 204, 405/203, 11, 12, 205, 206, 207, 208, 284, 287; 425/61, 59, 62; 264/31; 249/10–12, 137, 65, 26, 19

[56] References Cited

U.S. PATENT DOCUMENTS

| 782,557 | 2/1905 | Hadlock et al. | 405/207 |
| 1,294,556 | 2/1919 | Spelman | 405/286 |
| 1,310,461 | 7/1919 | Williams | 405/204 |
| 1,773,454 | 8/1930 | Fowler | 249/137 X |
| 2,029,004 | 1/1936 | Varni | 405/223 X |
| 2,050,727 | 8/1936 | Misz | 405/223 X |
| 2,658,353 | 11/1953 | Trexel | 405/209 |
| 2,966,778 | 1/1961 | Quirin | 405/203 |
| 3,054,267 | 9/1962 | Alcorn et al. | 405/209 |
| 3,080,636 | 3/1963 | Zerlaut | 249/137 UX |
| 3,464,212 | 9/1969 | Yamagata et al. | 405/204 |
| 4,556,342 | 12/1985 | Tannahill | 405/203 |

Primary Examiner—Dennis L. Taylor
Attorney, Agent, or Firm—Barrigar & Oyen

[57] ABSTRACT

A method and apparatus for making a dock or sea wall whereby the wall comprises at least one sectional dock member, the dock member comprising a concrete base section and a concrete wall section perpendicular to and attached thereto. A forming float device is used to make each sectional dock member while the forming float device floats in a body of water (e.g. sea). Both the base and wall sections of the dock member are formed horizontally on the water, thereby simplifying the means of constructing and positioning the dock members. The forming float device provides a base section forming surface and a wall section forming surface perpendicular thereto. Rotation means are used to rotate the forming float device from a first position in which the base section is horizontally formed to a second position in which the wall section is also horizontally formed. Then the forming float device is rotated a third time to properly orient the dock member prior to positioning the dock member on the sea floor. Ballasting of the forming float device may be used to stabilize the device and position the dock member on the sea floor. A stabilizer float device connected to the forming float device may also be used to control the rotation of and stabilize the forming float.

7 Claims, 12 Drawing Sheets

METHOD AND APPARATUS FOR CONSTRUCTING SEAWALLS AND DOCKS

FIELD OF THE INVENTION

The present invention relates to apparatus for and a method of building dock structures which are used in marine applications. More particularly, this invention is concerned with apparatus for and a method of building L-shaped reinforced concrete cantilevered retaining walls or sectional dock members which serve as dock structures for ports and marinas.

BACKGROUND

The dock walls to which the invention pertains are of the gravity, autostabilized-type whereby fill material positioned behind the wall is used to both retain the wall structure (by exerting a force on the footing of the L-shaped wall member) and form the horizontal ground surface of access from the shoreline to the dock face.

At present, concrete gravity-type walls are commonly constructed either in place (at the intended location) behind a very expensive shelter (i.e. cofferdam) or are built on land remote from the intended location and later positioned into place using cranes positioned on land or on barges.

In either of these cases, the floor or bed of the body of water is usually excavated or dredged to provide a horizontal surface on which a layer of crushed stone is placed and graded to form a smooth horizontal surface on which the base of the L-shaped wall member rests. This is known as the mattress.

In either of these cases, the concrete is formed and poured in two stages: first, the base is poured as a flat horizontal slab parallel to the ground, and second, the wall is vertically formed adjacent to the slab using appropriate formwork and supports such that the wall extends at substantially right angles to the base slab. Thus, this method necessitates the cost of vertically forming, pouring and stripping the wall which adds expense to the process and requires greater degrees of skilled tradespersons.

The present invention provides a new approach to building gravity stabilized seawalls and dock faces for marine terminal and marina installations which avoids these problems and reduces construction costs.

SUMMARY OF THE INVENTION

In accordance with the invention there is provided a method of making a dock or sea wall using a forming float device which floats in a body of water in which the dock or sea wall is constructed. The wall comprises at least one sectional dock member. A base section of said sectional dock member is formed and secured on an upper first surface of the float device whereby the longitudinal axis of the base member is horizontal during formation of the base member. The float device is rotated a first time such that the base section assumes a substantially vertical position and a second surface of the float device assumes an upper horizontal position. A wall section of said sectional dock member is then formed on the second surface of the float device whereby the lower end of the wall section attaches and is secured to the adjacent end of the base section in perpendicular relationship thereto and the longitudinal axis of the wall section is horizontal during the formation of the wall section. The float device is then rotated a second time whereby the base section assumes a lower substantially horizontal position and the wall member assumes a substantially vertical position. The sectional dock member comprising the base and wall sections is then positioned on a mattress placed at the pre-selected location of the floor or bed of the body of water whereby the base section rests on the mattress. After the placement, the float device is released from the sectional dock member, Finally, fill material is placed behind the wall of the sectional dock member and over the base section.

Preferably, a stabilizer float device is connected to the forming float device for controlling the rotation of the float device and for stabilizing the float device. The positioning step preferably includes ballasting the float device and the stabilizer float device to cause them and the sectional dock member to lower to the pre-selected location.

Also in accordance with the invention there is provided apparatus for making a dock member comprising a base section and a wall section substantially perpendicular thereto and for use in constructing a dock or sea wall. The apparatus is able to float in a body of water and includes a forming float device comprising a first surface and a second surface in perpendicular relationship thereto. Means are included for forming and securing the base section on the first surface of the float device.

Means are also included for forming the wall section on the second surface of the float device whereby one end of the base section attaches to one end of the wall section. Rotation means permits rotation of the forming float device for permitting both said base and wall sections to be formed in a horizontal position.

Preferably the apparatus further comprises means for ballasting the forming float device. Also preferably, the apparatus further comprises a stabilizer float device connected to the forming float device whereby the stabilizer float device comprises means for controlling the means for rotating the forming float device and means for stabilizing the forming float device.

BRIEF DESCRIPTION OF THE DRAWINGS

A more detailed description of the invention is described below (under the following heading) with reference to the following drawings in which like numerals refer to like elements throughout.

(Note.

FIG. 2 is an elevation view of apparatus used to make and position a dock wall in accordance with the invention, the forming float being in position to prepare the base section;

FIG. 3 is an elevation view of the apparatus of FIG. 2 following the completion of the formation of the base;

FIG. 4 is an elevation view of the apparatus of FIG. 3 following a clockwise rotation of 90 deg., the forming float being in position to prepare the wall section;

FIG. 5 is an elevation view of the apparatus of FIG. 4 following the completion of the formation of the wall section;

FIG. 6 is an elevation view of the apparatus of FIG. 5 following a clockwise rotation of 90 deg., the forming float being in position to place the sectional dock member (comprising base and wall sections) in its intended (final) location;

FIG. 7 is a subsequent view of the apparatus of FIG. 6 at which time the sectional dock member has been placed in its intended location and the forming float device has been detached therefrom;

DETAILED DESCRIPTION OF A PREFERRED EMBODIMENT

Figure 1:
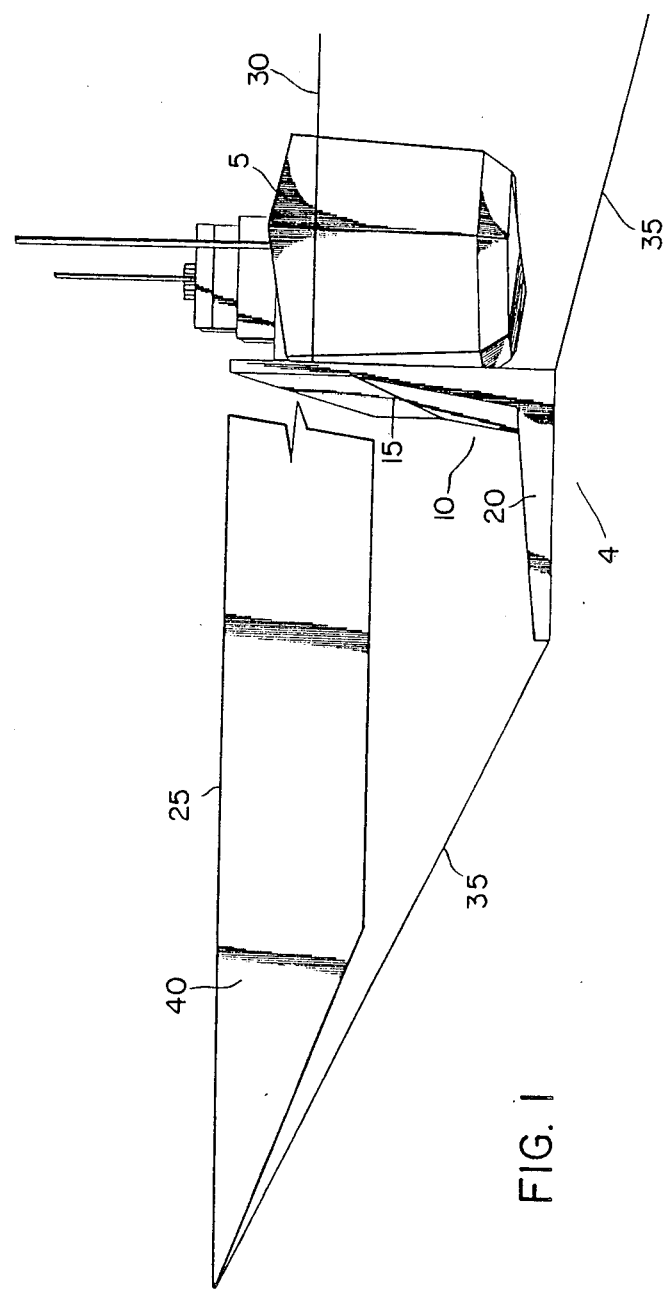
FIG. 1 is an elevation side view of a dock wall which has been constructed in accordance with the invention and also illustrates the mattress below the wall, a platform which is the upper surface of the fill material placed behind the wall and a ship adjacent the waterside of the wall.
Figure 2:
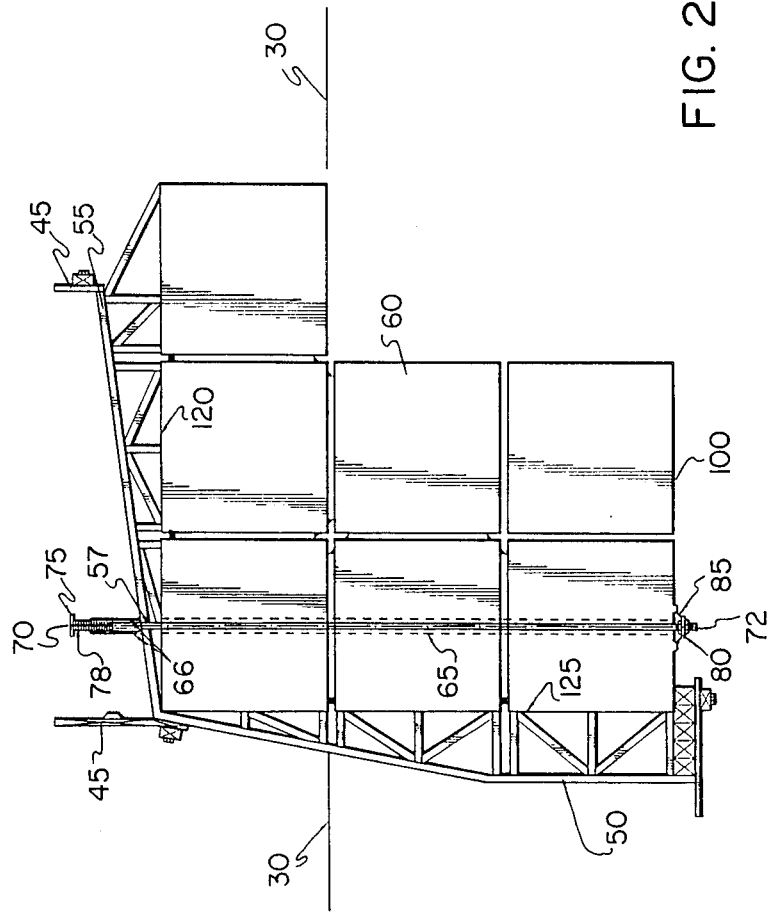
FIGS. 2-7 exclude from those view a stabilizer float device and cantilever brackets attaching the same to the illustrated forming float device; these are shown in FIGS. 8-12.)
Figure 3:
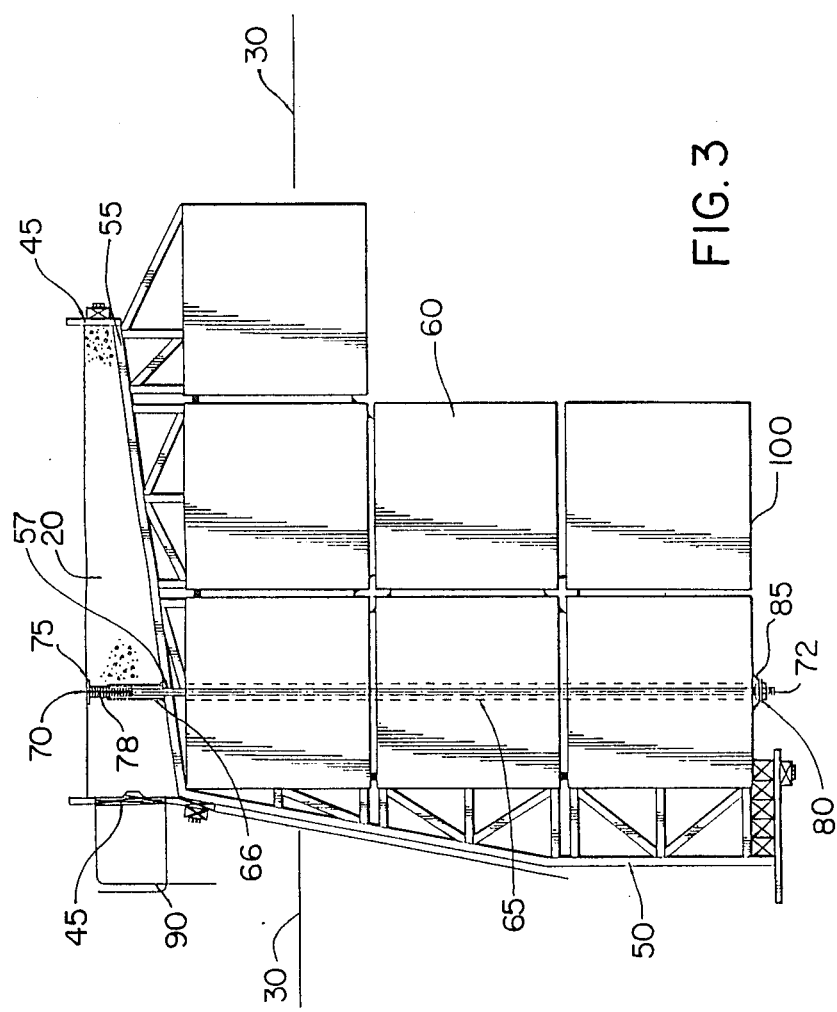

Method and Apparatus For Making and Positioning Sectional Dock Member:

Referring to FIGS. 1 through 8, the apparatus used in making and placing a sectional dock member 10 will be described. A forming float 60, preferably rectangular in shape, is provided with a base deck 120, a wall deck 125 and an underdeck 100. Forming float 60 is preferably made of a steel skin reinforced by an interior structural steel frame but may, alternatively, be constructed of any other suitable material. The interior of forming float 60 is preferably compartmentalized whereby the compartments may be either filled with or emptied of water in order to position and stabilize the float 60, as described below.

Attached to and adjacent the base deck 120 and wall deck 125 are a base form 55 and wall form 50, respectively, the latter to be used to provide forms for the base and wall sections 20, 15, respectively, of the sectional dock member 10. A plurality of hold down rods 70 fasten the base section 20 (and thus the sectional dock member 10) to the forming float device 60. One of said decks 120, 125, 100, e.g. the base deck 120, is above the water line 30 at any given time. When the forming float 60 is in its first orientation shown in FIG. 2, the base deck 120 is in a horizontal position parallel to and above the water line.

In order to effect rotation of forming float 60 (as described in greater detail below), two large diameter drums 105 (only one illustrated—see FIG. 8) are framed one to each end of the forming float 60 and centered on the longitudinal axis of forming float 60. Said hold down rods 70 extend completely through forming float 60, parallel to the wall deck 125, and are preferably made of steel (though any appropriate material may be used in the alternative, depending upon the specific circumstances). Each of the rods 70 is fastened to the base section 20 by means of lower threads 78 which engage in a threaded insert 75 which is cast into the concrete of the base section 20. Each rod 70 passes through the base section 20 through a passageway 66 formed in the concrete, which is installed before the base concrete is poured. The hold down rods 70 then pass through holes 57 in the base form 55 and then through pipes 65 which pass through the forming float device 60. The passageway form 66 is constructed to prevent the molten concrete from escaping through the holes 57 and from jamming the hold down rods 70 when they exit the threaded inserts 75. The said pipes 65 are each welded around their perimeter to the base deck 120 and the underdeck 100 to prevent water leakage from the sea into the forming float 60. The underdeck ends 72 of hold down rods 70 are fastened by threaded nuts 80 to bosses 85 anchored to the frame of the forming float 60. Removal of nuts 80 and removal of hold down rods 70 by turning and disengaging the lower threads 78 from the inserts 75 cast in the base section concrete 20 provides for the release of the forming float 60 from the sectional dock member 10 at the appropriate time (as is described below in greater detail).

Located on and attached to the surface of base deck 120 are a base form 55 and four base form bulkheads 45, one on each of the four sides of the base form, into which concrete (for example) is poured for forming the base section 20. The base form 55 may be constructed of any suitable construction material of which steel is a preferred example and may preferably be provided with steel supports. Of course, the base form 55 must be designed according to the specifications which are desired for the shape and configuration of the base section 20 to be adopted for any particular job and no single shape or configuration is specifically contemplated by the invention. The drawings herein illustrate the preferred shape and configuration for the base section 20 adopted for use in the preferred embodiment disclosed herein. The base form bulkheads 45 may preferably be constructed of steel and are located at each side of the base form 55 (only two bulkheads 45 being viewable in the figures). The base section 20 of the sectional dock member 10 is constructed by simply pouring or placing the desired construction material, preferably concrete, into the area defined by the base form 55 and bulkheads 45 (together forming a base form structure) such that the shape of the resulting base section 20 is defined by the shape of that area. The said bulkheads 45 are removed from the base form 55 after the concrete has been poured and sufficient time has elapsed to allow the concrete to harden.

Figure 4:
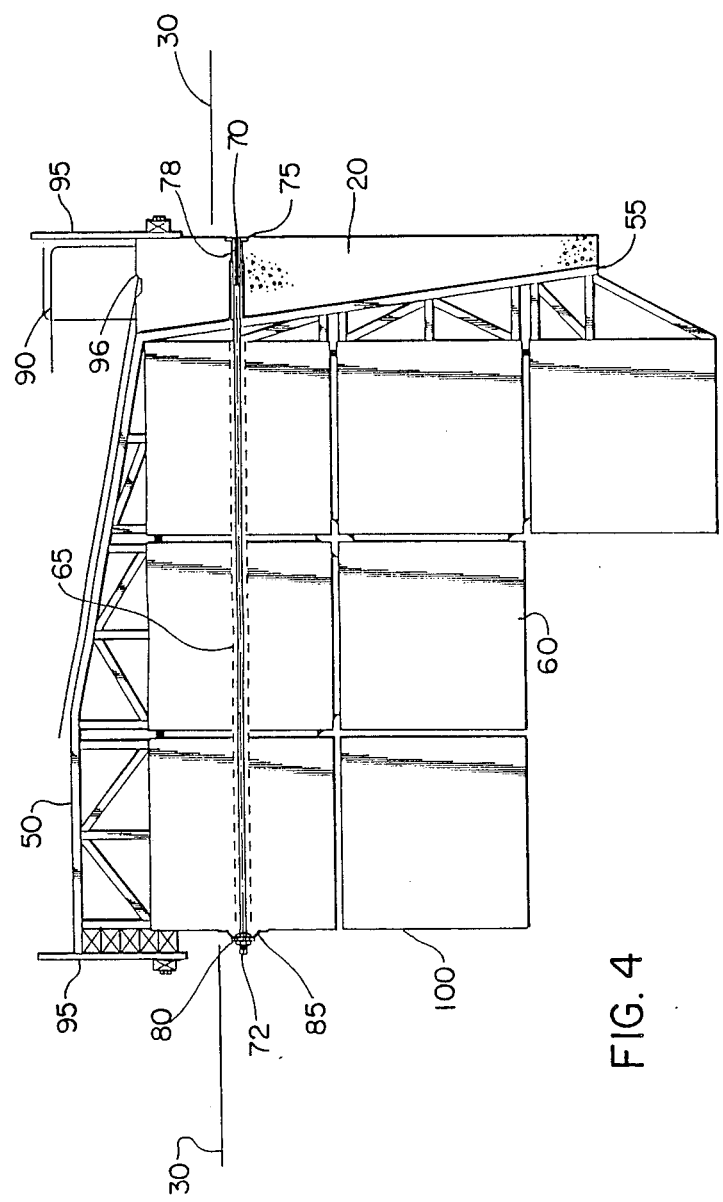

A wall form 50 is provided on and attached to the wall deck 125 for forming the wall section 15 of the sectional dock member 10. Following a 90 deg. clockwise rotation of the forming float 60 (which is described in greater detail below), wall form bulkheads 95 are constructed and attached as shown in FIG. 4 to the four sides of the wall form 50 (again, only two bulkheads 95 being viewable in the figures). As previously discussed with respect to the base section 20 of the sectional dock member 10, the wall section 15 is constructed according to the specifications which are desired for the particular job and the wall form 50 is configured accordingly. The wall form bulkheads 95 and the wall form 50 (together forming a wall form structure) provide a closed area for receiving and retaining the material selected to comprise the wall section 15. The said bulkheads 95 are removed after sufficient time has elapsed to allow the wall section material, e.g. concrete, to harden.

Figure 8:
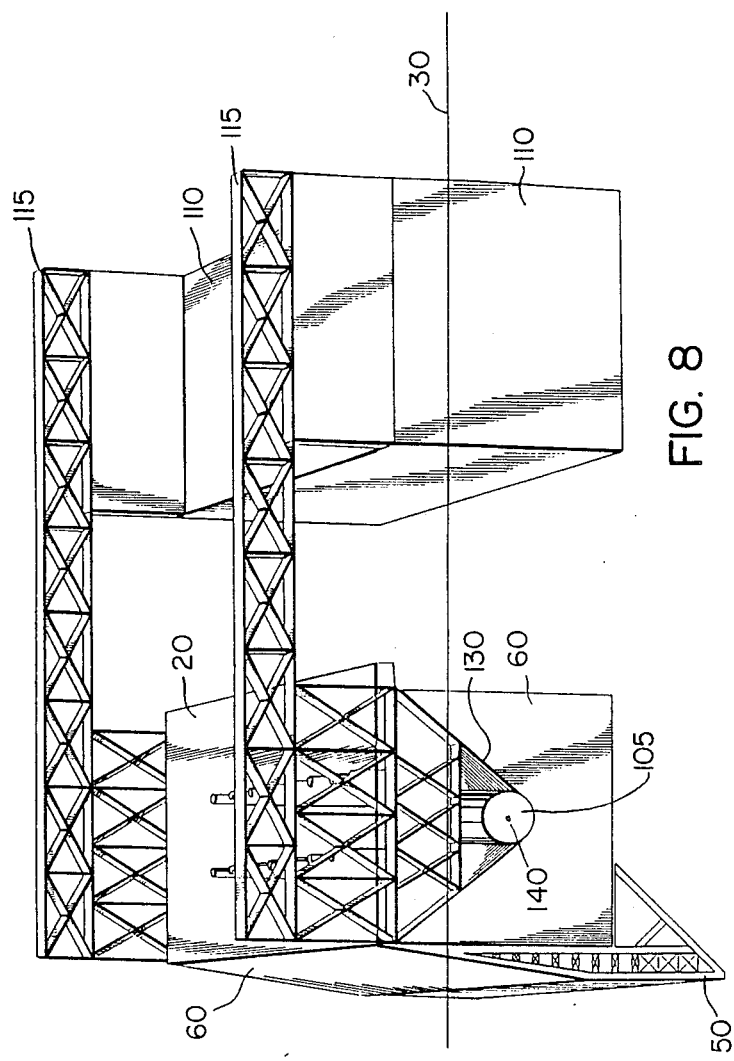
FIG. 8 is a perspective elevation view of the forming and stabilizer float devices, with cantilever brackets attaching the said float devices together, wherein the forming float is in the position illustrated by FIG. 3.
Figure 9:
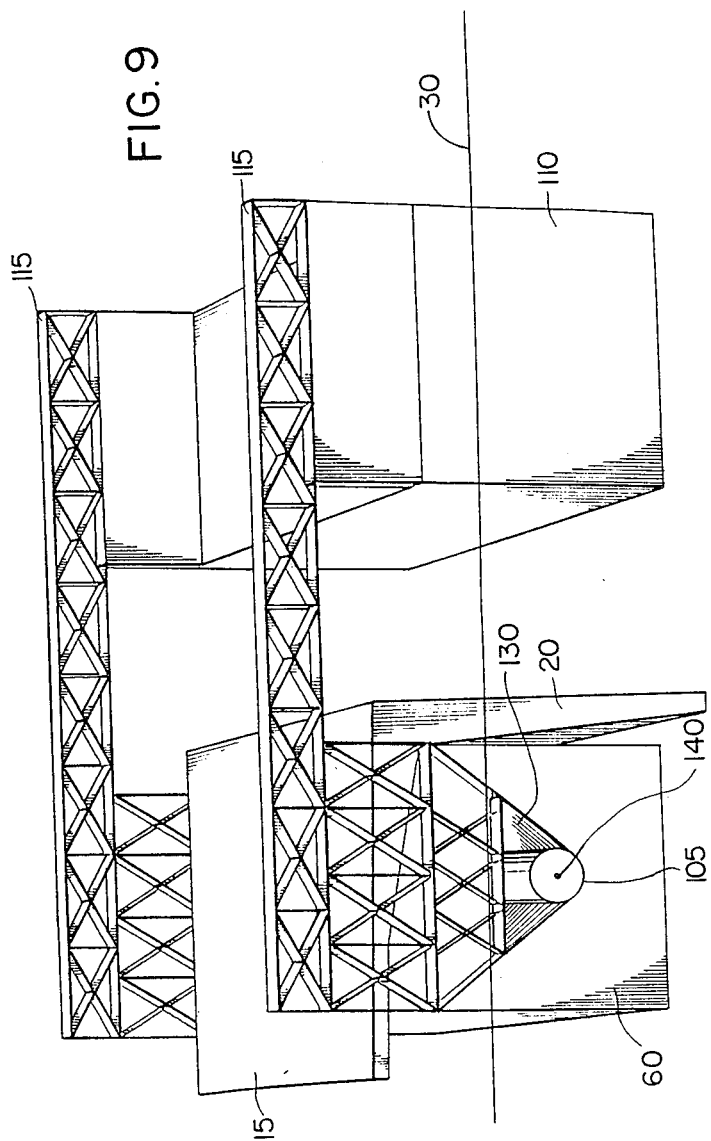
FIG. 9 is a perspective elevation view of the apparatus shown in FIG. 8 following a clockwise rotation of 90 deg. of the forming float device.
Figure 10:
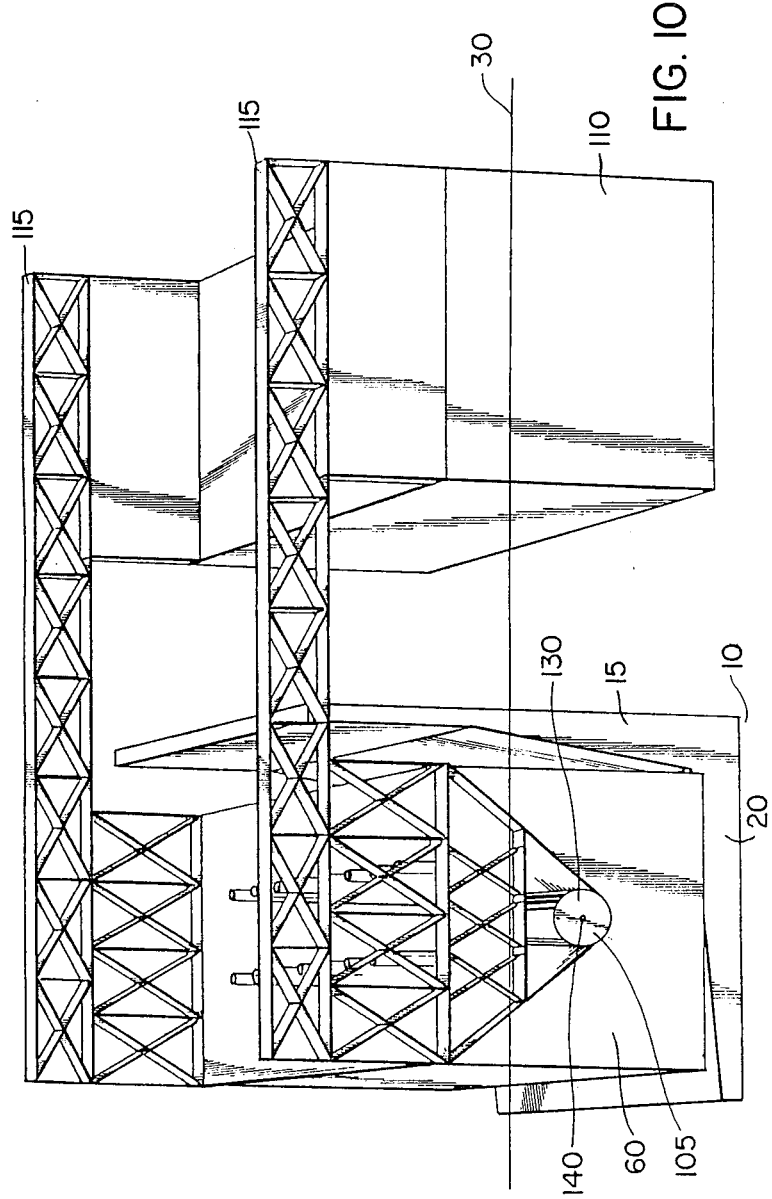
FIG. 10 is a perspective elevation view of the apparatus shown in FIG. 9 following a further clockwise rotation of 90 deg. of the forming float device.
Figure 11:
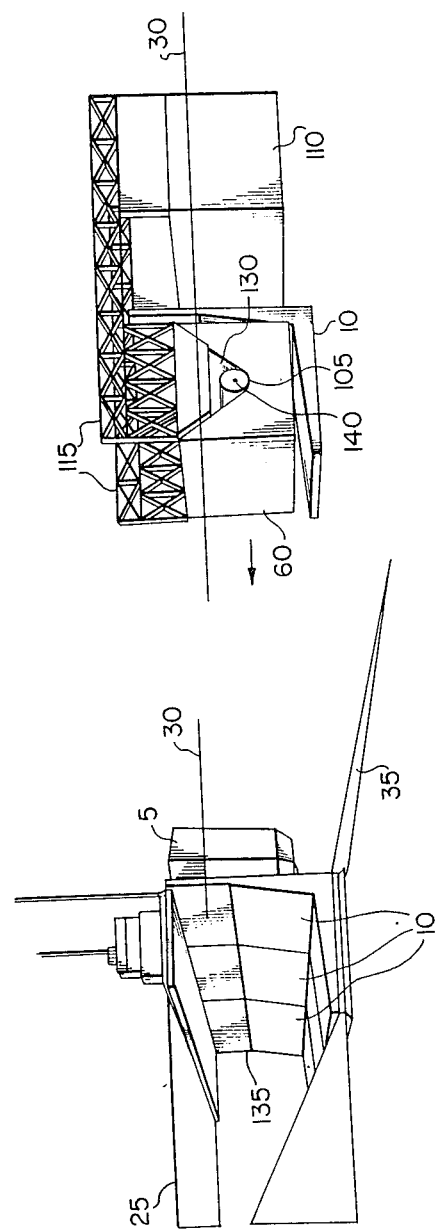
FIG. 11 is a combined perspective elevation view showing a partially completed dock wall formation on the left and the apparatus of FIG. 10 on the right, the latter being oriented for placing the sectional dock member of FIG. 10 into its intended location adjacent a sectional member of the illustrated partially completed dock wall formation, and, FIG. 12 is a combined perspective elevation view showing in the background a partially completed and land-filled dock wall formation and, in the foreground, the apparatus of FIG. 10 positioned for placing a sectional dock member into its intended location adjacent a sectional member of the illustrated partially completed dock wall formation.
Figure 12:
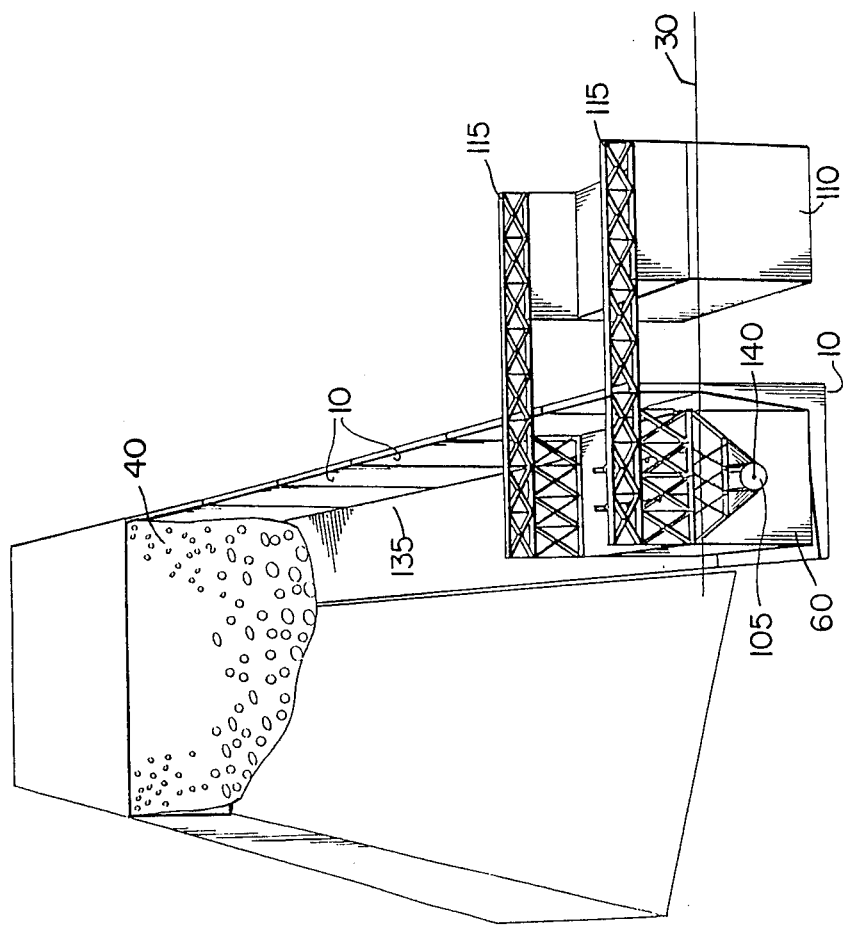

Referring now to FIG. 8, a stabilizer float device 110 is connected to the forming float device 60 by two connecting brackets 115, one at each end of the forming float 60. The said connecting brackets 115 are cantilevered above the top surface of the stabilizer float 110 and extend horizontally past the boundaries of the stabilizer float 110 to and above the forming float device 60. The connecting brackets 115 are not directly attached to the forming float 60 but rather, are directly connected to a pivoting device 130 which is in rotational communication with two drums 105. The said drums 105 are longitudinally attached to each end of the forming float 60 along the central longitudinal axis of the forming float 60.

The stabilizer float 110 is of a similar construction to the forming float 60 and also has a compartmentalized interior whereby one or more compartments within the stabilizer float 110 may be flooded with or emptied of water to permit stability and adjust the trim of the floats.

Method of Making a Sectional Dock Member:

For the following discussion reference should be made to FIGS. 1 through 7 of the drawings. Prior to being partially submerged in a body of water, the forming float 60 is provided with a base form 55, base form bulkheads 45 and a wall form 50. Hold down rods 70 are placed in pipes 65 running through the forming float 60 and fastened appropriately to the bosses 85 by threaded nuts 80. Where the pipes 65 exit the forming float 60 at the underdeck 100 and base deck 120, their perimeters are welded to the deck surfaces in order to prevent leakage of water into forming float 60.

After the forming float 60 has been partially submerged in water with the base deck 120 uppermost and horizontal, the forms for the passageways 66 for the hold down rods are installed. Threaded inserts 75 are then installed on the lower threads 78 of the hold down rods 70. Concrete (or other selected material) is poured into the area defined by the base form 55 and base form bulkheads 45. Accordingly, the base section 20 of the sectional dock member 10 is formed in a horizontal position, in like manner as a poured concrete slab, on an upper first surface of the float 60. Preferably, reinforced concrete is used for the base section 20 rather than concrete alone. A number of reinforcing steel members 90 are installed in the concrete and are left protruding through holes in the base form bulkhead 45 at the base section end 96 adjacent to the wall section. After the concrete has set, the base form bulkheads 45 are removed. At this time the hold down rods 70 have been engaged within the threaded inserts 75 by their lower threads 78 and the base section 20 is thereby fastened to the forming float 60 by the threaded inserts 75 which are now embedded in the concrete, and by the hold down rods 70, and by the threaded nuts 80 which anchor onto the forming float 60 on the underdeck 100 by means of the bosses 85 fastened to it. The hold down rods 70, inserts 75, lower threads 78, nuts 80 and bosses 85 must be of satisfactory material and/or of sufficient number so as to provide adequate strength to secure the entire sectional dock member 10 to forming float 60.

The bulkheads 45 are removed when the concrete has hardened. The forming float 60 is then rotated clockwise 90 deg. as shown by FIG. 4 of the drawings so that the wall deck 125, being a second surface of the float device 60, assumes an upper horizontal position parallel to and above the water line. At the same time, the base deck 120, which has secured to it the base form 55 and base section 20, becomes vertically positioned such that the base section 20 is at least partially submerged in water. Wall form bulkheads 95 (made of steel, for example) are then installed at each of the four sides of the wall form 50 as illustrated. Next, concrete is poured into the area defined by the wall form 50 and wall form bulkheads 95 (and, again, it is preferable to use reinforced concrete then concrete alone). Reinforcing steel placed in the wall section is attached to the previously placed reinforcing steel 90 left protruding from the base section end 96 adjacent to the wall section to securely attach the base and wall sections together. Using the reinforcing members 90 and well-known construction concrete construction techniques, a structural bond may be realized between the base and wall sections 20, 15. The concrete is retained in and assumes the shape of the said area and after the concrete has set, the wall form bulkheads 95 are removed. Accordingly, the wall section 15 of the sectional dock member 10 is also formed in a horizontal position in like manner as a poured concrete slab.

Figure 5:
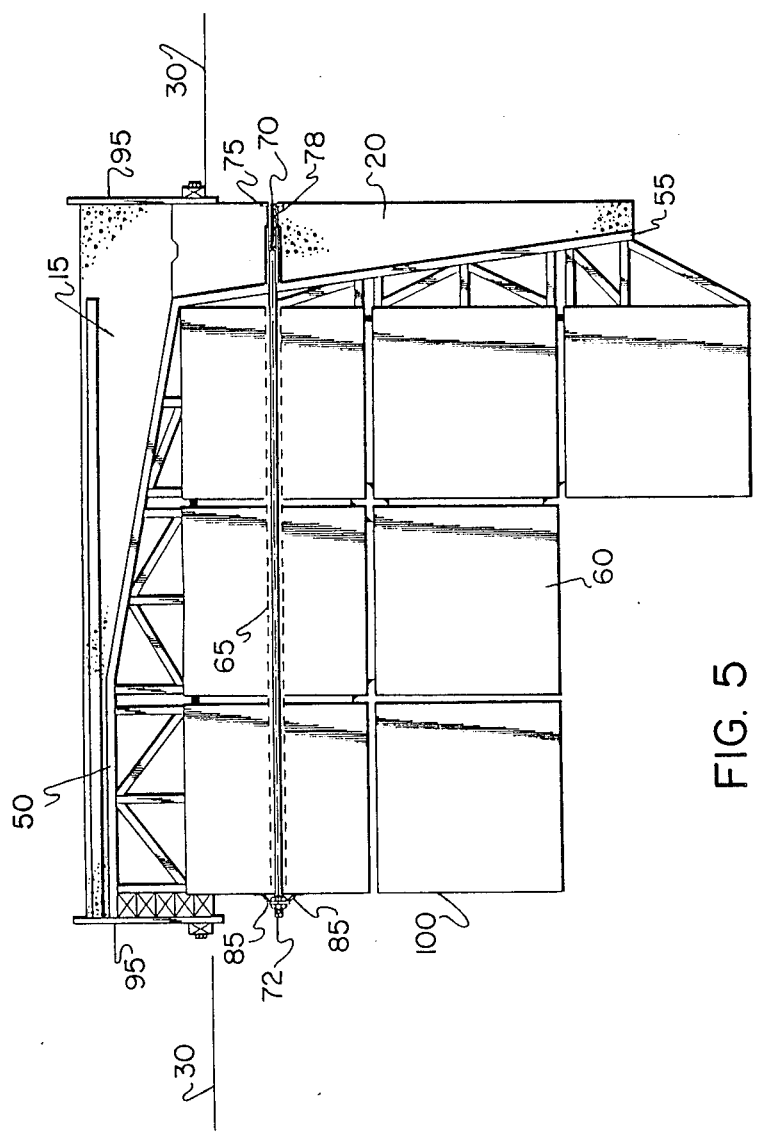
Figure 6:
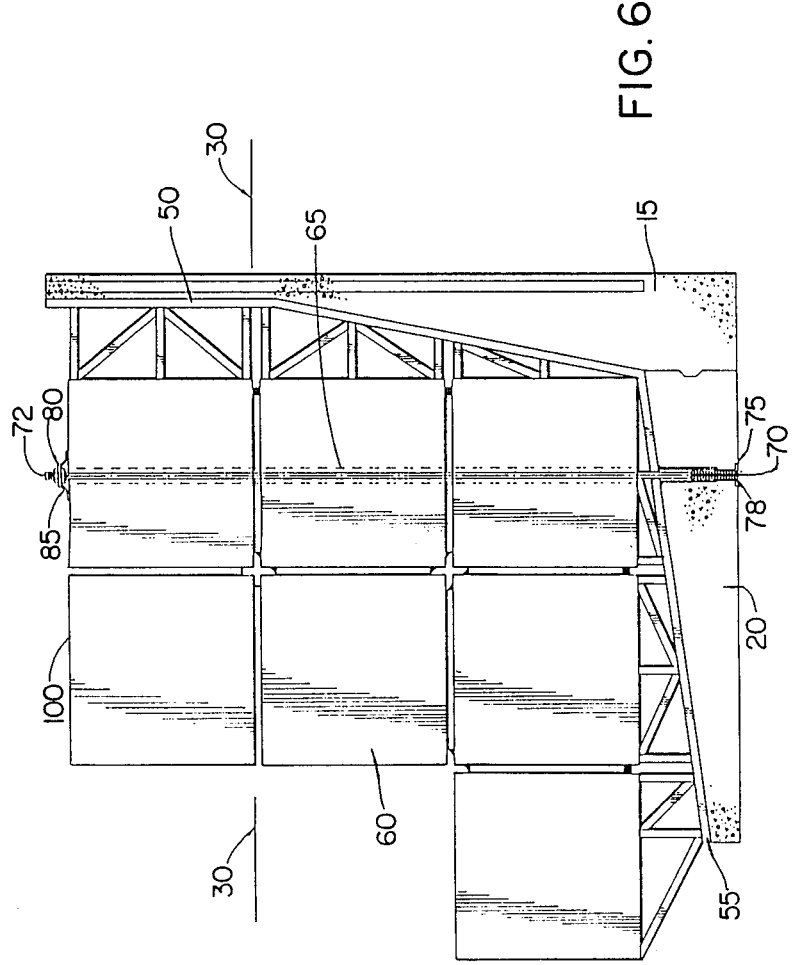

Following the above steps, the forming float 60 is in the position shown in FIG. 5 of the drawings and therefore the sectional dock member 10 is not yet oriented appropriately for positioning it relative to the dock wall being constructed. To properly orient the sectional dock member 10, the forming float 60 is a second time rotated clockwise 90 deg. as shown by FIG. 6 of the drawings whereby the base section 20 assumes a lower horizontal position and the wall section 15 assumes a vertical position. Ballasting of the forming float 60 is carried out as may be necessary to ensure that the sectional dock member 10 floats in a truly vertical position (still attached to the forming float 60).

Following the final orientation of the sectional dock member 10 as described in the foregoing, the forming float 60 and dock member 10 are, together, transported (i.e. floated) to the appropriate place above the floor 35 of the body of water and the dock member 10 is then placed in its intended final position on the mattress 4 to form part (or possibly all) of a dock wall 135 (or sea wall), the latter step being described in greater detail below under the following heading.

Method of Orienting, Transporting and Placing the Sectional Dock Member:

For the following discussion, reference should be made to FIGS. 8 through 12 of the drawings. The forming float 60 is manipulated and stabilized by means of a stabilizer float 110 which is indirectly connected thereto. That is, these floats 60, 110 are not in direct contact but rather are separated from each other and in a parallel configuration. The preferred distance between the two floats is determined by the particular circumstances and specifications of the installation being performed. The important criterion is that the floats 60, 110 be positioned, one relative to the other, such that the maximum amount of stability is achieved for both the forming float 60 and the stabilizer float 110. As well, there of course must be sufficient distance between the two floats 60, 110 that the sectional dock member 10 can be rotated freely upon rotation of the forming float 60.

As previously described, the stabilizer float device 110 is connected to the forming float device 60 by means of two cantilevered brackets or arms 115 at each end. These brackets 115 may be constructed of a number of types of suitable construction material; the preferred material being steel.

The said brackets 115 have directly attached to them a pivoting device 130 which in turn is in rotational communication with the drums 105 attached to the forming float 60. Control of the rotation of the forming float 60 is effected as follows. The two large diameter drums 105 are framed one to each end of the forming float 60 and centered about pivot points 140 of the float 60 such that the drums are located on the central longitudinal axis of the forming float 60. A pivoting device 130 comprises a length of heavy steel wire rope (not specifically illustrated) which is wound around the drums 105 and continues to the top of the brackets 115 through sheaves (not specifically illustrated) where the rope is wound or unwound (as desired) on a winch having two counter-wound drums (not specifically illustrated). The drums 105 are also counter-wound and the said rope is clamped at one point to each drum 105. This configuration of counter-wound drums permits rotation of the forming float 60 in one direction or another depending on the direction of the winch. As well, the said winch comprises brakes for securing the forming float 60 and mechanical locks are provided between the brackets 115 and forming float 60 for safety purposes.

The location of the pivot points 140 at each end of the forming float 60 are selected more or less to coincide with the central longitudinal axis of forming float.

Figure 7:
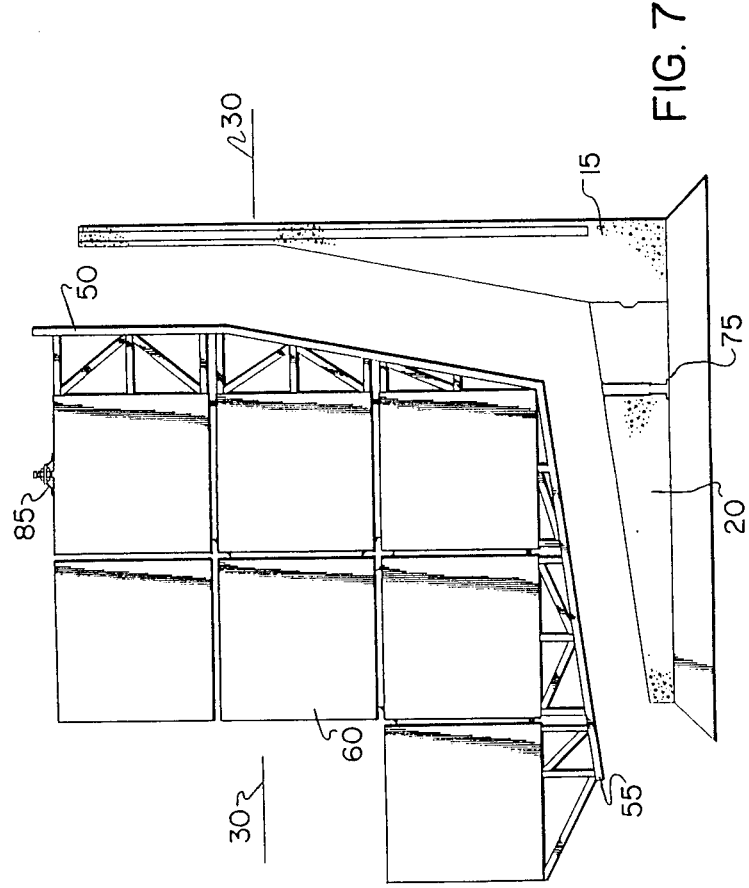

The forming float 60 and stabilizer float 110 are positioned as desired by the use of tug boats and winches. Following the formation of the sectional dock member 10 (as described above) and proper orientation of the same, one longitudinal edge of the sectional dock member 10 is positioned (while still attached to the forming float 60) adjacent the longitudinal edge of the dock wall 135 under construction. The forming and stabilizer floats 60, 110 are then lowered by flooding the compartments of the floats 60, 110 or by tidal action, so as to place the sectional dock member 10 on the mattress 4 on the floor 35 of the body of water at the desired location next to the dock wall 135. The threaded nuts 80 are removed and the hold down rods 70 are then removed from the forming float 60 by turning and disengaging their lower thread 78 from the inserts 75. The floats 60, 110 are then made to float (or travel) to the surface of the water away from the installed sectional dock member 10, as illustrated in FIG. 7.

A clean and assured release of the concrete surfaces of the base and wall sections 15, 20 adjacent the surfaces of the base form 55 and wall form 50 is vital. This is reliably achieved by suitably dimensioning the base form 55 and wall form 50 to permit a ¼ inch to 1 inch thick layer of coarse sand or fine crushed rock to be placed on the horizontal surface of the floors of the base and wall forms 55, 50 prior to placing concrete into those forms. In this manner, the molten concrete rests on the base and wall surface layer of sand/rock and is prevented from adhering to the base and wall form surfaces. Additionally, when the dock member 10 is immersed, water penetrates the voids provided in the said surface layer thereby equalizing hydrostatic pressure on all sides of the sectional dock member 10 and permitting a clean release.

Following the foregoing procedure, the forming and stabilizer floats 60, 110 may be returned to the construction area of the body of the water which has been used to construct the sectional dock member 10 and the hold down rods 70 refastened to the bosses 85 on the forming float 60 by means of the nuts 80. The bosses 85 are designed to provide a method whereby the hold down rods 70 can be securely fastened by the nuts 80 to the forming float 60 and remain positioned there during the 180 deg. rotation prior to the installation of the threaded inserts 75 and the pouring of the concrete base. Preferably two nuts 80 are provided, one on each side of the boss plate through which a hold down rod 70 passes. Each hold down rod 70 is secured by tightening two nuts 80 against a boss plate and is later released by unscrewing the nuts 80. Once the rods 70 have been resecured to the forming float 60 the float 60 may then be rotated 180 deg. to return to its original position whereby the base 120 is positioned parallel to and above the water line 30 (per FIG. 2).

The above-described procedures may then be repeated as many times as is desired to construct and install a desired number of sectional dock members 10 so as to make a dock (or sea) wall 135. As the dock wall 135 is being constructed according to the foregoing, fill material 40 is placed behind the wall 135 and on top of the base section 20 so as to stabilize the dock wall 135 and provide a platform 25 from the shoreline to the dock face.

It is important to secure a close fit between adjoining faces of the sectional dock members 10 to prevent leakage of fill material. This is preferably effected by providing a profile at the longitudinal ends of the abutting dock member walls in the form of a tongue and groove system that will effectively seal the wall joints. Use of a profile, as described, also provides a means of facilitating the proper alignment of the sectional dock members as they are sequentially placed.

What is claimed is:

1. A method of making a dock or sea wall comprising at least one sectional dock member, said method using a forming float device floating in a body of water such that an upper surface of the device extends above the water line, said method comprising the steps:

forming and securing a base section of said sectional dock member on an upper first surface of said forming float device whereby the longitudinal axis of said base member is horizontal during said step of forming said base member;

rotating, a first time, said forming float device whereby said base section assumes a non-horizontal position and a second surface of said forming float device assumes an upper horizontal position;

forming a wall section of said sectional dock member on said second surface of said forming float device whereby one end of said wall section attaches to one end of said base section in perpendicular relationship thereto and the longitudinal axis of said wall section is horizontal during the step of forming said wall section;

rotating, a second time, said forming float device whereby said base section assumes a lower substantially horizontal position and said wall member assumes a substantially vertical position;

positioning said sectional dock member comprising said base and wall sections on a pre-selected location of the floor of said body of water;

removing said forming float device from said sectional dock member; and placing fill material behind said sectional dock member such that said material is positioned over said base section and against said wall section.

2. The method of claim 1 further comprising the step of connecting a stabilizer float device to said forming float device for controlling the rotation of said float device and for stabilizing said float device.

3. The method of claim 2 whereby said positioning step includes ballasting said float device causing said flat device and sectional dock member to lower to said pre-selected location.

4. The method of claim 3 whereby said steps of forming and securing a base section and forming a wall section include placing concrete over said first and second surfaces of said float device, respectively, within an area defined by a base form structure and wall form structure, respectively and allowing said concrete to harden.

5. Apparatus for making a dock wall member for use in constructing a dock or sea wall, said dock wall member comprising a base section and a wall section substantially perpendicular thereto, whereby said apparatus is able to float in a body of water such that an upper surface thereof extends above the water line, said apparatus comprising:

a forming float device comprising a first surface and a second surface in perpendicular relationship thereto;

means for forming and securing said base section on said first surface of said float device;

means for forming said wall section on said second surface of said float device whereby one end of said base section attaches to one end of said wall section, and means for rotating said forming float device for permitting both said base and wall sections to be formed in a horizontal position on an upper surface of said forming float device.

6. Apparatus according to claim 5 and further comprising means for ballasting said forming float device.

7. Apparatus according to claim 6 and further comprising a stabilizer float device connected to said forming float device, said stabilizer float device comprising means for controlling said means for rotating said forming float device and means for stabilizing said forming float device.

* * * * *